United States Patent [19]

Gifford

[11] 4,339,095

[45] Jul. 13, 1982

[54] OSCILLATOR SYSTEM FOR FISHING REEL

[75] Inventor: Richard L. Gifford, Tulsa, Okla.

[73] Assignee: Brunswick Corporation, Skokie, Ill.

[21] Appl. No.: 85,927

[22] Filed: Oct. 18, 1979

[51] Int. Cl.$^3$ ............................................. A01K 89/01
[52] U.S. Cl. ........................... 242/84.21 R; 74/22 R; 74/569
[58] Field of Search ................. 242/84.21 R, 84.51 A, 242/84.5 A, 84.2 R, 22, 569

[56] References Cited

U.S. PATENT DOCUMENTS

| | | | |
|---|---|---|---|
| 2,713,463 | 7/1955 | Sarah | 242/84.21 R |
| 2,863,617 | 12/1958 | Chapin et al. | 242/84.5 A |
| 2,971,720 | 2/1961 | Wood | 242/84.21 R |
| 3,499,613 | 3/1970 | Sarah | 242/84.21 R |
| 3,946,963 | 3/1976 | Oberg | 242/84.51 A |
| 4,077,587 | 3/1978 | Ueda | 242/84.21 R |
| 4,114,825 | 9/1978 | Murvall | 242/84.21 R |

FOREIGN PATENT DOCUMENTS 2824740 12/1978 Fed. Rep. of Germany ... 242/84.21 R
577244 5/1946 United Kingdom ......... 242/84.21 R Primary Examiner—Billy S. Taylor
Attorney, Agent, or Firm—John G. Heimovics

[57] ABSTRACT

This invention comprehends an improved means for providing a reciprocating motion for the spool of the spinning style fishing reel. In the normal rewind mode of operation, the spool oscillates back and forth relative to the line winding means. In this reel, the oscillating motion is produced by a cam-yoke arrangement mounted within the housing and unique in the fishing reel art.

18 Claims, 8 Drawing Figures

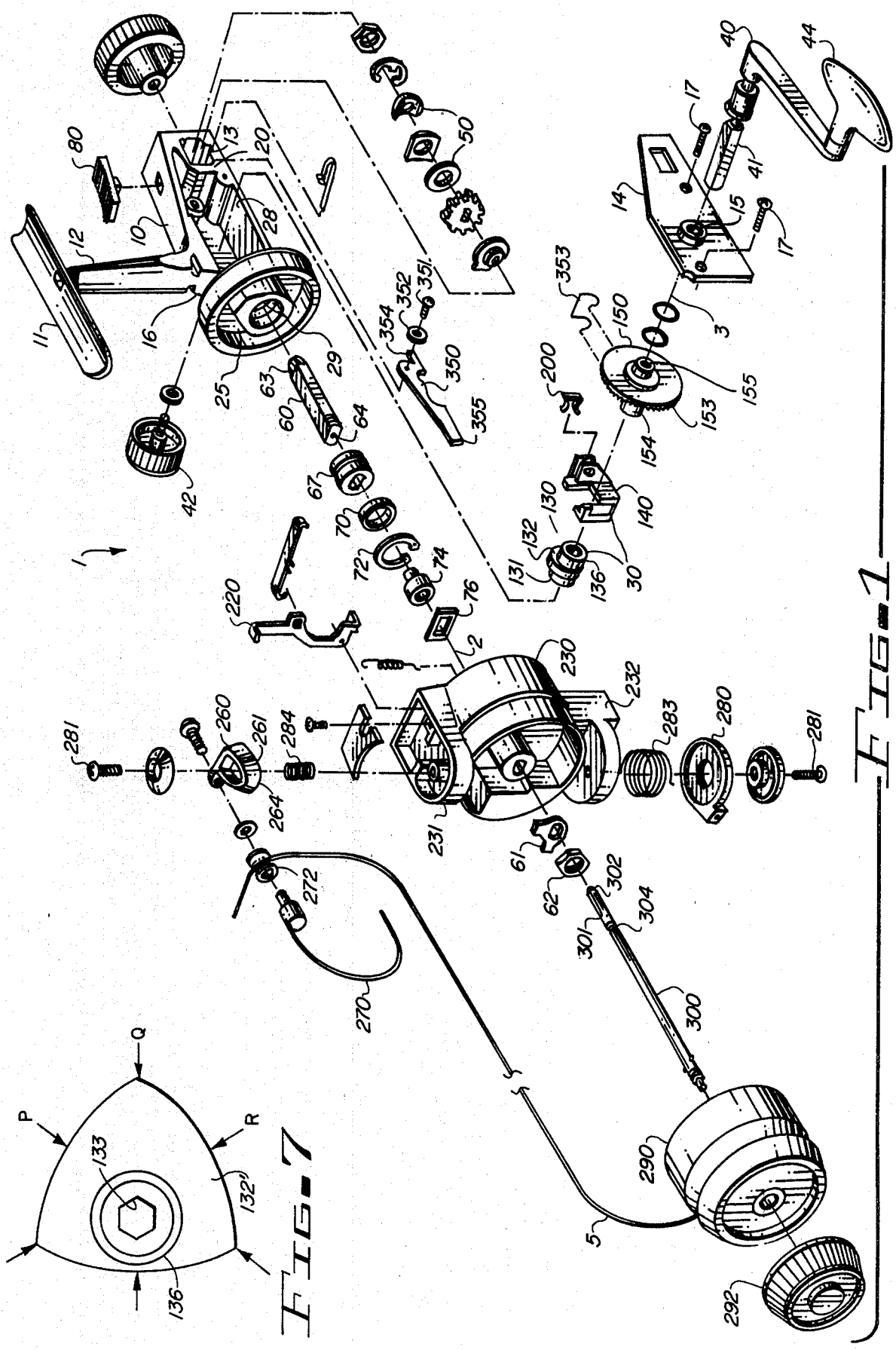

OSCILLATOR SYSTEM FOR FISHING REEL

BACKGROUND OF THE INVENTION

1. Field of the Invention

This invention relates to spinning style fishing reels, and more particularly, relates to a mechanism that causes the spool shaft to reciprocate back and forth as fishing line is wound about the spool.

2. Background of the Prior Art

It is well known in the prior art to cause a spool of an open face spinning style fishing reel to reciprocate back and forth as fishing line is being wound by the line guide of the rotor around the spool. Generally, the drive gear that turns the pinion gear has a short stubby shaft that projects into the center of the reel housing. Just such a spinning reel is depicted in U.S. Pat. No. 2,863,617 wherein the short shaft is coupled to the spool shaft by a simple clip. A better arrangement for providing reciprocating motion is shown in U.S. Pat. No. 2,773,655 where a small L-shaped block with a slot is coupled to the drive gear stud to provide the reciprocating motion for the shaft.

A more sophisticated arrangement is shown in my U.S. Patent application Ser. No. 932,844, filed Aug. 11, 1978, now U.S. Pat. No. 4,193,562, wherein a slide that is coupled to the spool shaft derives its reciprocating motion from a stud mounted on an oscillator gear that is rotated by a small gear that is mounted on the same shaft as the main drive gear.

In all these prior art teachings, the reciprocating motion is gained from a pin that is mounted on a rotating gear. There is no possibility of varying the reciprocating motion from the prior art devices. There is no possibility of providing a faster advance or retrieve in the prior art devices. There is no possibility of providing an even winding package on the spool by the prior art teachings. There is no possibility of providing a cam responsive reciprocating action in the prior art teachings.

SUMMARY OF THE INVENTION

This invention relates to spinning style fishing reels and comprehends an improved means for providing a pre-selected reciprocating motion for the spool shaft such that a variety of winding patterns can selectively be produced.

It is therefore an object of this invention to provide a reciprocating motion for a fishing reel that has a pre-selected positive designed reciprocating motion.

It is another object of this invention to provide a cam and yoke strap arrangement to provide the reciprocating motion for the spool shaft.

Still another object of this invention is the provision for such a cam-yoke arrangement where the fishing line is wound evenly on the spool.

Yet another object of this invention is the provision for such a means to impart reciprocating motion to the spool shaft where the advancing stroke or the retrieving stroke can be designed to follow any desired pattern.

Still yet another object of this invention is to provide a cam initiated reciprocating motion for the spool shaft.

The above and other and further objects and features will be more readily understood by reference to the following detailed description and accompanying drawings.

DETAILED DESCRIPTION OF THE DRAWINGS

FIG. 1 is an exploded perspective view of the spinning style fishing reel containing the invention described herein;

FIG. 7 is a side elevation view of another embodiment of the invention herein; and, FIG. 8 is a cross-sectional view of a fishing reel spool containing an evenly wound fishing line package.

DESCRIPTION OF BASIC STRUCTURE AND OPERATION OF FISHING REEL

Figure 4:
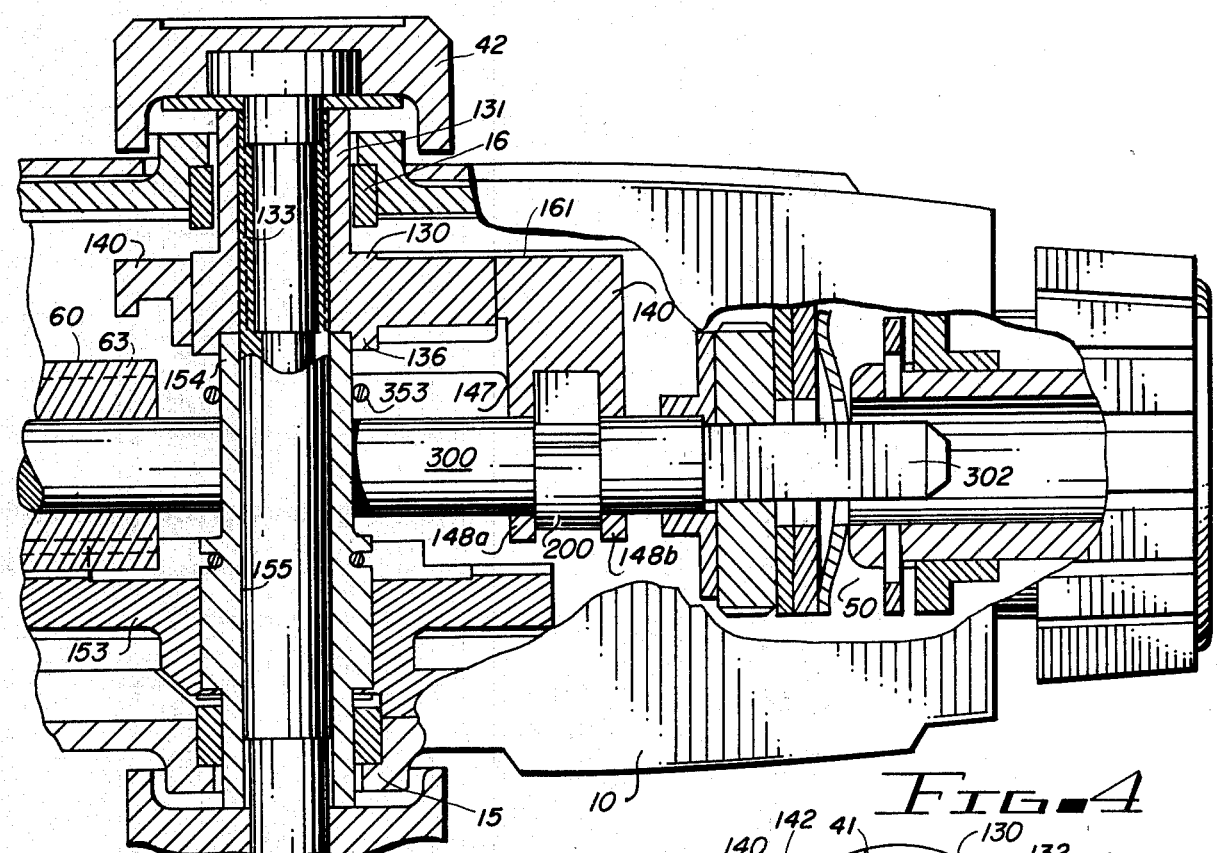
FIG. 4 is a partial top sectional view of a fishing reel containing the invention herein.

In FIG. 1 an open face style fishing reel 1 is shown in an exploded perspective view. The reel 1 having a housing 10 which includes an integral gear case 28, a stem 12 which connects the housing 10 to a mounting foot 11 which is used to attach the reel to a spinning style fishing rod. The reel includes a crank assembly 40 rotatable about a crank handle shaft 41 with a rotatable winding handle 44 for use by a fisherman with his left hand for line retrieval while the rod (not shown) is being held by his right hand. The handle 44 may be disposed on the other side of the gear case 28 to accommodate the personal desires of the user.

An axially mounted rotor housing 230 is provided and adapted to rotate about the axis 2 of the central spool shaft 300 as the crank 40 is turned for line retrieval with the line 5 being captured by the bail 270 passing over the line roller 272. The bail 270 and the line roller 272 rotate with rotor 230 and the fishing line 5 is thereby wound on the spool 290. The screws 281 function as pivot points and are accordingly the centers of rotation of the bail 270 via the bail arms 260 and 280.

An oscillator mechanism 30 causes the spool 290 to reciprocate axially back and forth as the rotor 230 winds a line 5 about the spool 290; but as in spinning reels generally, the spool 290 does not rotate about the axis of the central shaft 300 except as controllably permitted by the adjustable drag mechanism 50. Such limited rotation of the spool may occur during line retrieval when a fish is on the other end of the line 5 fighting for its life while still in the water; and, thus the force of the drag friction is overcome by tension in the line. This is a feature that prevents the internal mechanism from being destroyed when a large fish is on the end of the line 5. When the bail 270 is swung to an open position for casting, the line 5 may freely payout from the spool 290.

In the overall arrangement of the reel, a side cover plate 14 is secured to the housing 10 to cover the gear housing 28 which includes a drag pocket 13 and is accomplished by means of screws 17. The drive gear assembly 150 includes a drive gear 153 that is mounted on the drive gear shaft 154 and is received at one end in the side lip 136 of cam 130. Bearing collar 131 is coaxial with the lip 136 and mounted on the opposite side of the cam surface 132.

The gear assembly 150 and the oscillator cam 130 each have an internal hole and are coaxially mounted on the crank handle shaft 41 with the drive shaft 154 externally mounted in the side plate bearing 15 and the bearing collar 131 mounted in bearing 16, FIG. 4, that is part of the side of the housing 10 and coaxial with bearing 15. Oscillator slide yoke 140 surrounds cam surface 132 of the cam assembly 130 and is slidably mounted near the bearing 16 in the gear case 28. Retainer screw 42 secures the crank handle shaft 41 to the reel 1. As can be readily appreciated, the crank assembly 40 can be removed from the reel 1 and reversed so that the reel 1 can be held by a fisherman in his left hand and cranked by his right hand.

Pinion assembly 60 is mounted in the front hole 29 of the front face 25 and surrounded by bearing 70 which is kept in place by retainer 72. Mounted inside the gear case 28 on the pinion assembly 60 is the self-centering ratchet 67. In front of retainer 72, a spacer ring 74 and a trip lever retainer 76 are mounted on the pinion 60. The rotor 230 is mounted on the pinion assembly 60 in front of retainer 76 and is secured thereto by means of washer 61 and nut 62. Center spool shaft 300 is rotatably mounted in and supported by the pinion assembly hole 64 with the back end 301 thereof extending past the partition 20 into the drag assembly 50. The spool 290 is mounted on the shaft 300 and secured thereto by means of spool cap 292. The shaft 300 is secured to the oscillator yoke slide 140 and reciprocates back and forth relative to the rotor when the crank handle shaft 41 rotates.

Pinion gear 63 mounted at the back of the pinion assembly 60 mates with the drive gear 153 and is rotatable thereby. The pinion assembly 60 in turn causes the rotor 230 to rotate about the spool 290. Because the oscillator cam assembly 30 and the gear drive assembly 150 are both operated by the crank assembly 40 at the same time, the spool 290 reciprocates back and forth relative to the rotational motion of the line roller 272 about the spool and by this cooperative movement the line 5 is wound around the spool 290.

The axis 2 of the rotor 230, shaft 300, pinion assembly 60, and drag assembly 50 is approximately perpendicular to the axis 3 of the crank handle assembly 40, oscillator mechanism 30 and the drive gear assembly 150. The axis 2 is located above the axis 3 being nearer to the foot 11.

The bail 270 is normally stored in the "closed" or "retrieve" position whereby the line roller 272 functions to wind the line 5 about the spool 290 by turning the handle 44 relative to the reel 1. When the bail 270 is to be open or placed in the "casting" or "open" position, the bail 270 is pivoted about the L-shaped bail ears 231 and 232 and locked in place by the trip lever 220 that is received by the cam 261 and trip ramp 264 surfaces located on the underside of the bail arm 260; the underside of bail arm 260 faces into the cavity of the ear 231.

In the casting position, the line 5 is free to payout from the spool 290. During casting, this payout of the line is quite rapid, thus, the fisherman using this open faced style fishing reel is obligated to use his finger to snub the line to arrest the payout since neither the rewind or line retrieval mode (the winding of the line about the spool 290 by the line roller 272) or the drag mechanism 50 is operational. In order to change the bail from the "open" casting position to the "closed" rewind or retrieve position, the rotor 230 is rotated causing the trip lever 220 to disengage from the trip ramp 264 permitting the bail return springs 283 and 284 to pivot the bail 270 back to the retrieve position.

A feature of this fishing reel is a self-centering bail mechanism that permits the rotation of the rotor 230 to the same position for opening the bail 270 at the optimum casting position. A self-centering lever arm 350 is mounted within the gear case by means of screw 351 and washer 352 with the back end 354 of the arm 350 in operable engagement with the self-centering button 80. The lever arm spring 353 mounted on the drive gear shaft 154 urges the pawl end 355 toward the ratchet 67. But, with the button 80 in the back position, the pawl 355 is pivoted out of engagement with the ratchet 67. When the button 80 is in the forward position closer to the stem 12 and farther from the drag assembly 50, then the bottom of the button 80 permits the pawl end 355 of the arm 350 to come into contact with the ratchet 67 so that the rotor 230 can be rotated "backwards" (counter to the direction of rotation for winding the line around the spool) to a pre-selected position for opening the bail at the casting position. The same mechanism acts as an anti-reverse device for the reel so that the rotor can only be rotated "backward" less than one revolution.

DESCRIPTION OF THE PREFERRED EMBODIMENT

Figure 3:
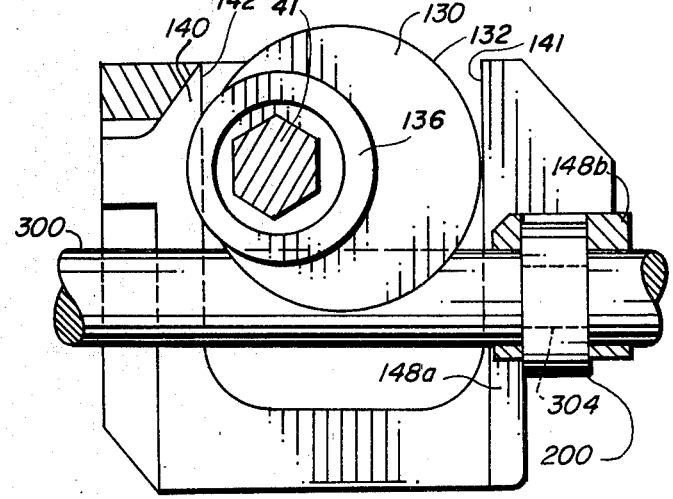
FIG. 3 is a segmented side view elevation of one embodiment of the invention herein.
Figures 2, 8:
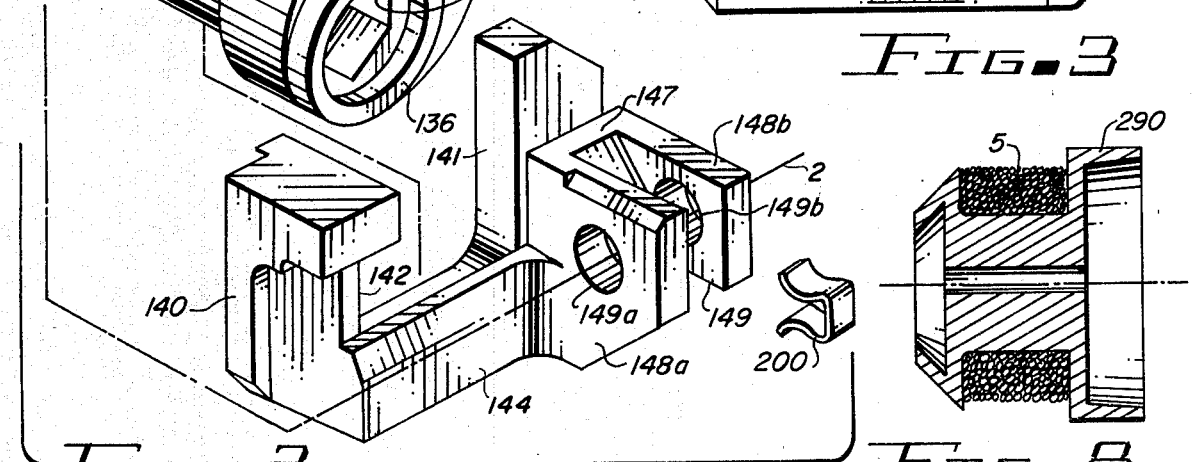
FIG. 2 is an enlarged exploded perspective view containing the invention hereof.

In a preferred embodiment of the invention, as shown in FIGS. 2 and 3, the oscillator mechanism 30 comprises basically a yoke strap and cam arrangement that is coupled to the central spool shaft 300 and provides a reciprocating motion thereto. The oscillator assembly 130 has a cam collar 131 and secured thereto is a cam element 132 with a cam surface. On the opposite side of the cam element 132 (from the cam collar 131) is an outwardly projecting lip 136 with a drive hole 133 passing through the cam collar 131, cam element 132 and lip 136. As depicted in FIGS. 2, 3, 5 and 6 the cam element 132 is a right circular cylinder with a circular cross-section with a center of formation "c" which is displaced from the axis 3. In the drive gear assembly 150, drive gear 153 is mounted on tubular drive shaft 154 which is journal mounted at one end in bearing 15. The other end of shaft 154 is mounted within lip 136. The hole 155 in the shaft 154 is coaxial with the hole 133 and axis 3. The collar 131 is journal mounted in bearing 16. The crank handle shaft 41 is slip fitted into the holes 133 and 155. The cam assembly 130 and the tubular shaft 154 are keyed to the shaft 41 by the hex shape, as shown, although any convenient type of shaft-key assembly can be utilized. Thus, when the handle 44 causes the shaft 41 to rotate, the gear 153, the cam collar 131 and the cam element 132 all rotate about the axis 3.

Figure 6:
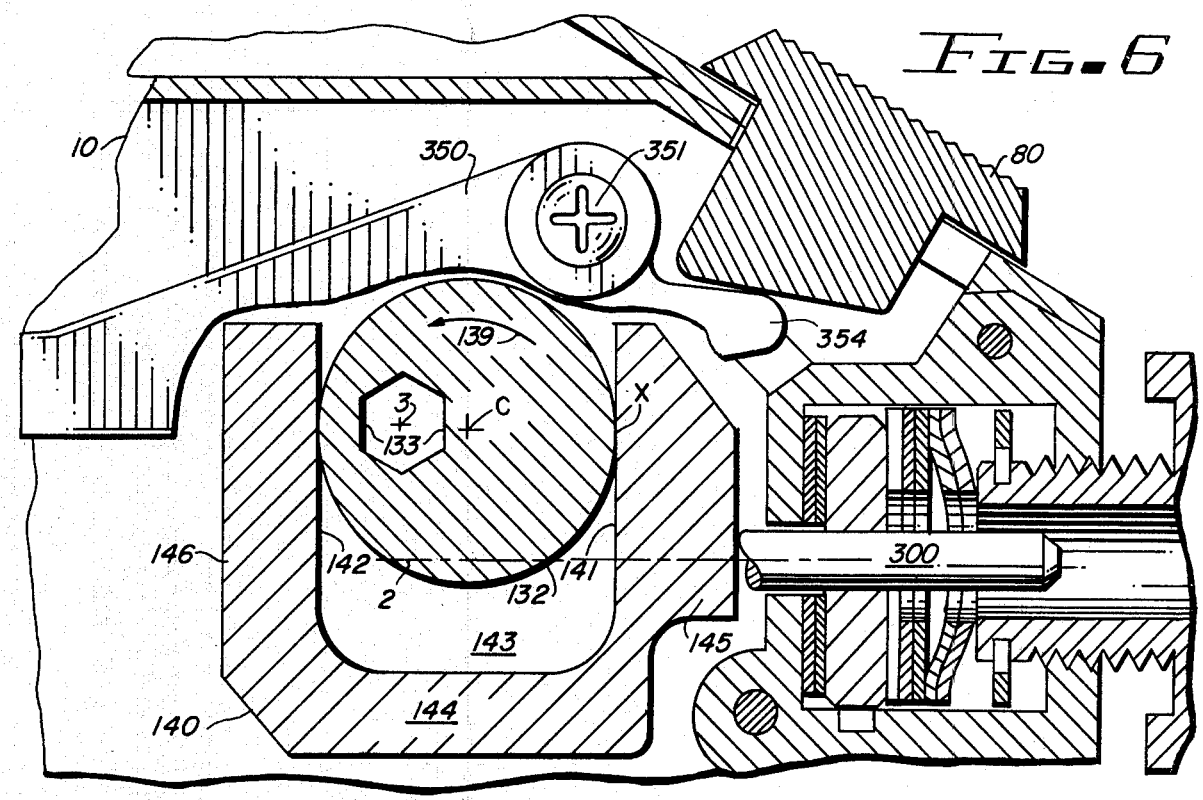
FIG. 6 is a partial cross-sectional side elevation view of a fishing reel containing the invention herein.
Figure 5:
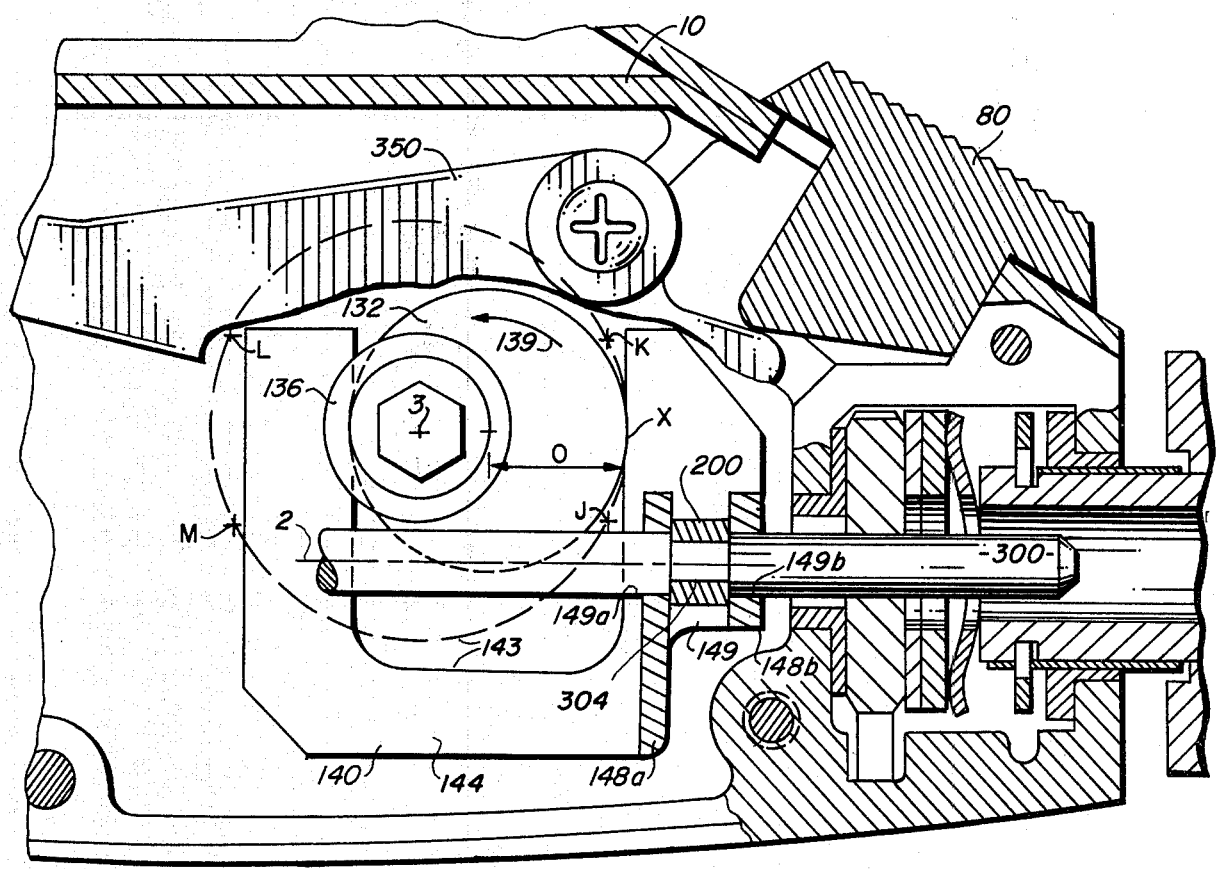
FIG. 5 is a partial cross-sectional side elevation view of a fishing reel containing the invention herein.

Straddling the cam element 132 is the oscillator slide 140 that is in the form of a modified yoke with a first cam follower surface 141 and a second cam follower surface 142 connected by a base 144. The cam follower surfaces 141 and 142 are spaced apart a distance that is just very slightly larger than the diameter of the cam element 132. This slight oversize is for clearance purposes. When the fishing reel is cranked with the left hand the direction of rotation of the cam element 132 is shown by the arrow 139. As shown in FIGS. 3, 5 and 6, the point "X" on the cam element 132 surface is depicted in the position closest to the back of the reel. When the oscillator cam assembly 130 rotates about axis 3, point "X" on the cam element 132 traces the circular path depicted by the dotted line 138, FIG. 5. Since there is sliding contact between the cam surface 132 and the cam followers 141 and 142 due to the small cam forces involved, the slide 140 reciprocates back and forth a distance "O" which is twice the distance between (1) the axis 3 (the center of the oscillator cam assembly 130) and (2) the center "c" of the circular surface of the cam element 132. Likewise, the slide-yoke 140 reciprocates back and forth a distance "O" also. The rotation of the cam element 132 is such that there is a clearance 143 between the base 144 and the path 138, FIG. 5.

The center spool shaft 300 is coupled to an outwardly extending clevis 147 on slide-yoke 140 which is best shown in FIG. 2 and includes a bifurcated fork with first lug 148a and second lug 148b spaced apart from each other. The shaft 300 is positioned in holes 149a and 149b in lugs 148a and 148b, respectively, with clip 200 snapped over undercut groove 304 in shaft 300. Thus, the reciprocating motion of the slide-yoke 140 is imparted to the center shaft 300. This reciprocating motion is similar to an eccentric motion of a pin on a drive gear except that the "throw" is not limited to some internal diameter of the drive gear. It is fully contemplated that any shape cam having a substantially uniform diameter can be utilized as a cam element 132 herein. FIG. 7 depicts such a cam surface 132' wherein the dimensions P, and R are substantially equal and thereby able to operate the slide-yoke 140. It should be noted that the cam 132' of FIG. 7 will impart a much different reciprocating motion to the slide-shaft combination than will the cam element 132 of FIG. 2. The motion of the point "X" that is provided by the cam element 132, shown in FIG. 5, produces a linear reciprocating motion of a dwell from "j" to "k", an advance from "k" to "l", a dwell from "l" to "m" and a retard or retract from "m" to "j". With different cam 132' configurations, such as the cam shown in FIG. 7, this dwell, advance, dwell, retract motion can be drastically altered or changed as desired.

It has been found that the motion provided by the cylindrical cam surface 132 provides a better motion for winding the line 5 evenly on the spool 290. The length of the stroke (the distance "O") is not limited to the eccentric pin on the drive gear of a fishing reel such as that found in U.S. Pat. No. 2,863,617. The spool 290 wound with a pre-selected even package produced by the invention hereof is shown in the cross-sectional view of FIG. 8. It is readily observable that the line 5 is evenly wound on the spool 290. By winding evenly, the problem of line shear in a spool is greatly reduced; and, depending upon the design of the cam, line shear can completely be eliminated.

The back side 161 of the side 140 bears against the inner wall of the housing 10 for sliding support and the clevis or fork 147 that is coupled to the shaft 300 co-acts to provide a positive path for the slide 140 as the followers 141 and 142 ride against the cam surface 132.

It has been found that to provide many different cam surfaces for the cam element 132 that the axis 2 of the shaft 300 must be displaced from the crank handle axis 3 in order to provide the greatest working clearance and swing for the cam element 132 and the slide-yoke 140. The greater the displacement between the two axes, the greater area that is provided for creative cam design to produce reciprocating motion for the spool.

It should be understood, of course, that the specific forms of the invention illustrated and described herein are intended to be representative only, as certain changes and modifications may be made without departing from the scope of the teachings herein disclosed. Accordingly, reference should be made to the appended claims in ascertaining the full scope of the invention.

What is claimed is:

1. In a spinning reel having a housing with a front spool end, a back drag assembly end and first and second side bearings, a pinion assembly mounted in the housing and defining a central axis, a center shaft coaxially slidably mounted in the pinion assembly and having a front end projecting forward of the housing's spool end and a drag end projecting into the housing, a spool mounted on the front end of the shaft, a crank handle shaft and gear train assembly including a tubular shaft co-mounted in the second side bearing substantially perpendicular to a vertical plane containing the central axis and operable with the pinion assembly causing a rotor mounted on the pinion assembly to revolve winding fishing line about the spool, the spool reciprocating forward and backward as fishing line is wound thereon to even out the fishing line package, improved reciprocating means being an oscillator mechanism comprising:
   (1) oscillator means mounted in the housing rotatable by the crank handle shaft and having:
      (a) bearing collar means received into the first side bearing having a collar axis coaxial with the crank handle shaft,
      (b) cam element means secured to the collar means having a cam surface parallel to the collar axis, and,
      (c) lip means secured to the cam element means and coaxial with the collar axis the tubular shaft having one end mounted in the lip means;
   (2) open end yoke means mounted in the housing and secured to the center shaft near the drag end, the yoke means being adjacent the cam element means and in substantially constant contact therewith; and,
   (3) rotation of the oscillator means about the collar axis supplies a pre-selected reciprocating motion to the spool relative to the rotation of the rotor about the spool to provide a pre-selected line package.

2. The reel of claim 1 wherein the tubular shaft has one end mounted in the side lip means and the other end mounted in the second bearing.

3. The reel of claim 1 or 2 wherein the oscillator means has a common passageway through the bearing collar means, cam element means and is surrounded by the lip means.

4. The reel of claim 3 wherein the passageway is coaxial with the collar axis.

5. The reel of claim 4 wherein the crank handle shaft is mounted within the tubular shaft in the common passageway with both shafts being keyed together.

6. The reel of claim 3 wherein the tubular shaft, crank handle shaft and bearing collar means have a common axis.

7. The reel of claim 6 wherein the common axis is displaced from the central axis.

8. The reel of claim 1 wherein the cam element means is a right circular cylinder having a cam axis that is parallel but displaced from the collar axis.

9. The reel of claim 8 wherein the cam element means is eccentric to the collar axis.

10. The reel of claim 1 wherein the cam element means is other than a right circular cylinder.

11. The reel of claim 1 wherein the yoke means has a base and first and second bifurcated cam followers.

12. The reel of claim 11 wherein each of the cam followers has a follower surface and wherein at least one follower surface is in substantially constant contact with the cam surface.

13. The reel of claim 11 wherein the first cam follower has a bifurcated fork having first and second lugs extending outwardly therefrom with a space in between the lugs.

14. The reel of claim 13 wherein each lug has a hole therein that is coaxial with the central axis for mounting the central shaft.

15. The reel of claim 14 further including means located in the space between the bifurcated lugs for securing the central shaft to the yoke means.

16. The reel of claim 11 wherein the base of the yoke means is free from contact by the cam surface.

17. The reel of claim 1 wherein the yoke means reciprocates parallel to the central axis.

18. The reel of claim 1 wherein the surface configuration of the cam element means and the distance of the cam surface from the collar axis determines a dwell, advance, dwell and retard pattern for the reciprocating stroke of the yoke means, central shaft and spool.

* * * * *